Dec. 19, 1950     W. A. SCOTT     2,534,738
MOUNT FOR ROTATING PARTS
Filed June 18, 1948
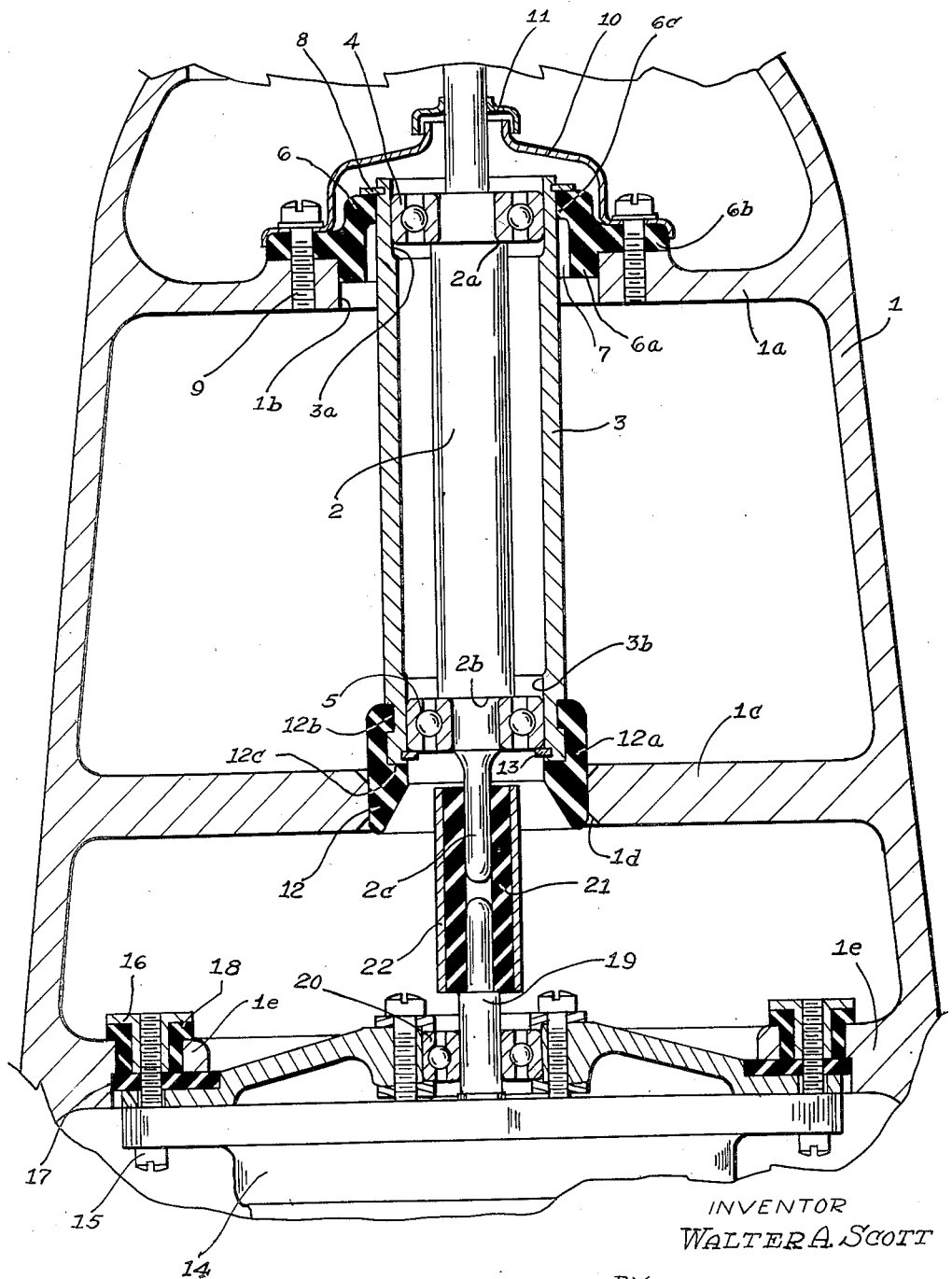
INVENTOR
WALTER A. SCOTT
BY Davis, Hoxie & Faithfull
ATTORNEYS

UNITED STATES PATENT OFFICE 2,534,738

MOUNT FOR ROTATING PARTS

Walter A. Scott, Poughkeepsie, N. Y., assignor to The De Laval Separator Company, New York, N. Y., a corporation of New Jersey Application June 18, 1948, Serial No. 33,858

4 Claims. (Cl. 308—143)

This invention relates to mounts for rotating parts and more particularly to an improved mount in which a rotatable spindle, or the like, is cushioned both radially and axially in its supporting frame and in addition is adjustable axially in the frame.

The new mount may be used to particular advantage for centrifuges of the direct-drive type, that is, in which the spindle of the centrifugal bowl is driven directly from an underlying motor in the frame, rather than through gearing. Accordingly, the invention will be described in such an embodiment, although it is to be understood that its use is not limited thereto.

It is well known that centrifugal separators are subject to considerable vibration even when the rotating parts are carefully balanced. In order to reduce the vibrations of the supporting frame, it is a common expedient to provide a yielding radial support secured to the frame around the spindle bearing near the centrifugal bowl so that the yielding support damps the radial vibrations. This yielding radial support is supplemented by a lower bearing for the spindle having direct radial support from the frame, the spindle also having a yielding axial support engaging the upper or lower bearing. Centrifuges of the direct-drive type, however, have somewhat different requirements than other types, with respect to the mounting of the rotatable parts. Direct-drive centrifuges are usually of relatively small weight and size so that they may be used upon a table top, and consequently the mount for the rotating parts should be light and compact. Also, the mount must function efficiently to damp even small vibrations of the rotating parts, because the frame generally rests loosely on the table top, making vibrations and attendant noise particularly objectionable. Additionally, the spindle should be adjustable axially in the frame to regulate the height of the bowl outlets relative to the stationary covers or receptacles for receiving the discharges, without impairing the efficiency of the vibration damping.

The present invention, therefore, is directed to the provision of an improved mount for a centrifuge spindle, or the like, which is particularly adapted to meet the above-mentioned requirements of a direct-drive separator and which, in addition, is of simple and rugged construction.

A mount made according to the invention comprises a tube surrounding the spindle, and upper and lower bearings in the tube for supporting the spindle radially therein while allowing axial movement of the spindle in the tube. The tube itself is mounted in upper and lower rubber-like supports closely surrounding the tube and secured to the frame, the tube being movably radially in the frame by reason of the resiliency of the supports. The spindle is supported axially in the tube by a driving element rotatable in the frame below the lower support. The driving element is preferably spaced axially from the spindle and connected thereto through a resilient rubber-like sleeve compressed around the adjacent ends of the spindle and driving element. The resilient sleeve thus damps axial vibrations of the spindle in the tube, accommodates radial movements of the spindle and the tube relative to the driving element, and yieldingly transmits torque from the driving element to the spindle.

In the preferred construction, the spindle is slidable axially in the tube to allow axial vibrations of the spindle on the resilient driving sleeve and also to allow axial adjustment of the spindle in the tube through the driving element, so as to regulate the height of the bowl outlets. Also, the rubber-like supports for the tube project from openings in the frame so that the ends of the supports engaging the tube are free to flex radially without engaging the frame. In this way, the supports are stressed in shear by radial movements of the tube and spindle, whereby the radial vibrations are more effectively damped.

For a better understanding of the invention, reference may be had to the accompanying drawing, in which the single illustration is a vertical sectional view of a centrifuge embodying the invention.

In the drawing, the numeral 1 designates a centrifuge frame having legs (not shown) adapted to rest upon a table top or bench, and 2 designates the spindle of a centrifugal bowl (not shown) rotatable in the frame. The spindle 2 is surrounded by a tube 3 spaced radially from the spindle and containing upper and lower bearings 4 and 5. The bearings closely surround the spindle and are slidable axially in the tube. More particularly, the inner race of the upper bearing rests upon a shoulder 2a of the spindle, and the outer race of this bearing is slidable in an enlarged recess 3a in the upper end portion of the tube; while the inner race of the lower bearing 5 engages an overhanging shoulder 2b of the spindle, and the outer race of the latter bearing is slidable in the lower portion 3b of the tube where its wall is somewhat thicker internally.

Near the upper end of tube 3, the frame has a horizontal partition 1a provided with a central opening 1b through which the tube extends with a substantial radial clearance. An annular rubber-like support 6 has a lower portion 6a closely fitted in the opening 1b, an intermediate radial flange 6b resting upon the top of the partition 1a, and an upper portion 6c having an internal flange closely surrounding the tube. The latter has a removable C-ring 8 resting upon the top of the internal flange 6c to support the tube axially. It will be apparent that radial movements of tube 3 will stress the upper portion of the resilient support 6 in shear, since the upper part is not engaged by the frame but is free to move radially, and the space 7 below the internal flange 6c allows such radial movements without compressing the lower part 6a of the support. The support 6 is secured to partition 1a by bolts 9 which also secure a stationary cover 10 overlying the upper end of the tube. An apron 11 rotating with the spindle has a depending part surrounding the neck of cover 10 to prevent entrance of liquid or dirt into the tube and the bearings.

The frame 1 also has a second horizontal portion 1c located slightly below the tube 3. An annular rubber-like support 12 is fitted closely in a central opening 1d in partition 1c and has an upper portion 12a projecting above the partition and closely surrounding the lower end portion of the tube. As shown, the upper portion of support 12 has an internal flange 12b engaged in an annular recess in the tube, and a ledge 12c supporting the lower end of the tube. A removable C-ring 13 is engaged in an annular recess in the tube and underlies the outer race of bearing 5 so as to form a stop or shoulder for limiting downward movement of the bearings and the spindle. Since the lower end of the tube is spaced above the partition 1c, radial movements of the tube will stress the rubber-like support 12 in shear.

The spindle 2 is driven by an electric motor 14 secured to the lower face of an inwardly extending annular flange 1e of the frame by means of bolts 15 and nuts 16. A rubber-like ring 17 is interposed between the adjacent faces of the motor and the flange 1e, and the nuts 16 are surrounded by bushings 18 of rubber-like material. The motor 14 has a rotor or driving element 19 which is adjustable axially in bearings 20 by any suitable means. As electric motors having axially adjustable rotors are well known, the details of the construction by which the rotor is axially adjusted are not shown.

The driving element 19 is coaxial with but spaced axially from the reduced lower end portion 2c of the spindle. It is connected to the spindle through a resilient driving connection comprising a sleeve 21 made of rubber or similar material and closely surrounding the adjacent end portions of the spindle and the driving element. The sleeve is held compacted against these end portions by a rigid sleeve 22 surrounding the sleeve 21, the end portions being forced into the sleeve 21 while it is confined in the rigid outer sleeve 22.

In the operation of the new mount, the rotor 19 may be raised to adjust the height of the spindle through the driving connection 21—22, so that the bowl outlets are at the proper level. In thus raising the spindle, the lower bearing 5 is lifted from the ring or stop 13 which limits its downward movement in the tube, and the upper bearing 4 slides upwardly in the recess 3a, the two bearings at all times being closely surrounded by the tube 3. Accordingly, the centrifugal bowl and its spindle 2 are supported axially on the motor 14 through the resilient driving connection 21—22. The flexible sleeve 21 serves to damp axial vibrations of the spindle relative to the driving element 19 and also to allow radial movements of the spindle relative to the driving element. In addition, the sleeve 21 affords a yielding means for transmitting the driving torque of the motor to the spindle. The radial vibrations of the spindle, transmitted through the upper and lower bearings 4 and 5 and the surrounding tube 3, are damped by the upper and lower rubber-like supports 6 and 12 which also support the tube axially. These radial vibrations are opposed by the yielding resistance of the rubber-like supports to shear, with the result that the centrifuge operates smoothly and quietly on the table top or bench.

In the event that it is desired to drive the spindle in its lowermost position, as shown, it is supported axially at least partly through the lower bearing 5, the C-ring 13, and the lower support 12, which is thus stressed in shear by the axial thrust of the spindle as well as by its radial movements.

It will be observed that by removing the cover 10, the spindle and its bowl may be lifted from the frame, either with or without the tube 3 and its resilient supports 6 and 12. The driving connection 21—22 then slides off the end of one of the members 2c and 19. Alternatively, by lifting the bowl from the spindle and detaching the ring 8, the spindle, its tube 3 and the lower support 12 may be removed from the bottom of the frame, from which the motor is also removed.

With the new construction, height adjustment of the bowl may be effected in other ways than by axial adjustment of the driving element 19. The height adjustment can also be made by means of spacer rings between flange 1a and the rubber-like support portion 6b. Alternatively, spacing washers may be placed between the C-ring 13 and the bottom of the outer race of bearing 5. In these ways, C-ring 13 carries the weight of the bowl and spindle regardless of the height adjustment, thereby relieving the driving element 19 of axial thrust from the driven parts.

I claim:

1. In combination with a spindle for a centrifugal bowl, or the like, and a frame in which the spindle is rotatable, a tube surrounding the spindle, upper and lower bearings in the tube for supporting the spindle radially therein while allowing axial movement of the spindle in the tube, upper and lower rubber-like supports closely surrounding the tube and secured to the frame, the tube being movable radially in the frame by reason of the resiliency of the supports, and a driving element rotatable in the frame below the lower support and connected to the spindle to hold the same axially in the tube, the tube having an outwardly extending flange overlying part of the upper support to hold the tube axially thereon.

2. In combination with a spindle for a centrifugal bowl, or the like, and a frame in which the spindle is rotatable, a tube surrounding the spindle, upper and lower bearings in the tube for supporting the spindle radially therein while allowing axial movement of the spindle in the tube, upper and lower rubber-like supports closely surrounding the tube and secured to the frame, the tube being movable radially in the frame by reason of the resiliency of the supports, and a driving element rotatable in the frame below the lower support and connected to the spindle to hold the same axially in the tube, the frame having a horizontal partition with an opening therethrough, the upper support having an outer peripheral portion engaging the partition around the opening and also having an inwardly extending flange engaging the tube at a region spaced axially from said peripheral portion, whereby the upper support is stressed in shear by radial movements of the upper part of the spindle.

3. In combination with a spindle for a centrifugal bowl, or the like, and a frame in which the spindle is rotatable, a tube surrounding the spindle, upper and lower bearings in the tube for supporting the spindle radially therein while allowing axial movement of the spindle in the tube, upper and lower rubber-like supports closely surrounding the tube and secured to the frame, the tube being movable radially in the frame by reason of the resiliency of the supports, and a driving element rotatable in the frame below the lower support and connected to the spindle to hold the same axially in the tube, the lower support being a sleeve having its lower part closely received in an opening in the frame, the upper portion of the sleeve being free to move radially relative to the frame, the tube terminating at its lower end in said upper portion of the sleeve, whereby the lower support is stressed in shear by radial movements of the lower end of the spindle.

4. In combination with a spindle for a centrifugal bowl, or the like, and a frame in which the spindle is rotatable, a tube surrounding the spindle, upper and lower bearings in the tube for supporting the spindle radially therein while allowing axial movement of the spindle in the tube, upper and lower rubber-like supports closely surrounding the tube and secured to the frame, the tube being movable radially in the frame by reason of the resiliency of the supports, and a driving element rotatable in the frame below the lower support and connected to the spindle to hold the same axially in the tube, the frame having a pair of openings spaced axially with respect to the spindle, each support having an end portion closely received in one of the openings and having its other end portion engaging the tube and movable freely in radial directions, whereby the supports are stressed in shear by radial movements of the spindle.

WALTER A. SCOTT.

REFERENCES CITED

The following references are of record in the file of this patent:

UNITED STATES PATENTS

| Number | Name | Date |
|---|---|---|
| 1,883,203 | Whitehouse | Oct. 18, 1932 |

FOREIGN PATENTS

| Number | Country | Date |
|---|---|---|
| 251,593 | Great Britain | Aug. 26, 1926 |